US009968880B2

(12) United States Patent
Goeppert et al.

(10) Patent No.: US 9,968,880 B2
(45) Date of Patent: May 15, 2018

(54) REGENERATIVE ABSORBENTS OF MODIFIED AMINES ON NANO-STRUCTURED SUPPORTS

(71) Applicant: UNIVERSITY OF SOUTHERN CALIFORNIA, Los Angeles, CA (US)

(72) Inventors: Alain Goeppert, Los Angeles, CA (US); Hang Zhang, Los Angeles, CA (US); G. K. Surya Prakash, Los Angeles, CA (US); George A. Olah, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 145 days.

(21) Appl. No.: 15/506,077

(22) PCT Filed: Nov. 4, 2014

(86) PCT No.: PCT/US2014/063850
§ 371 (c)(1),
(2) Date: Feb. 23, 2017

(87) PCT Pub. No.: WO2015/084521
PCT Pub. Date: Jun. 11, 2015

(65) Prior Publication Data
US 2017/0304764 A1    Oct. 26, 2017

Related U.S. Application Data

(60) Provisional application No. 61/910,886, filed on Dec. 2, 2013.

(51) Int. Cl.
| | | |
|---|---|---|
| *B01D 53/02* | (2006.01) | |
| *B01D 53/62* | (2006.01) | |
| *B01D 53/73* | (2006.01) | |
| *B01D 53/81* | (2006.01) | |
| *B01J 20/28* | (2006.01) | |
| *B01J 20/26* | (2006.01) | |
| *B01J 20/10* | (2006.01) | |

(52) U.S. Cl.
CPC ............ *B01D 53/02* (2013.01); *B01D 53/62* (2013.01); *B01D 53/73* (2013.01); *B01D 53/81* (2013.01); *B01J 20/103* (2013.01); *B01J 20/262* (2013.01); *B01J 20/28007* (2013.01); *B01D 2252/204* (2013.01); *B01D 2257/504* (2013.01)

(58) Field of Classification Search
CPC ........ B01D 2252/204; B01D 2257/504; B01D 53/02; B01D 53/62; B01D 53/73; B01D 53/81; B01J 20/103; B01J 20/262; B01J 20/28007
See application file for complete search history.

(56) References Cited

U.S. PATENT DOCUMENTS

| | | | |
|---|---|---|---|
| 4,044,100 A | 8/1977 | McElroy, Jr. | |
| 4,629,476 A * | 12/1986 | Sutt, Jr. .................. | B01D 53/02 95/138 |
| 4,810,266 A | 3/1989 | Zinnen et al. | |
| 5,087,597 A | 2/1992 | Leal et al. | |
| 5,376,614 A | 12/1994 | Birbara et al. | |
| 5,492,683 A | 2/1996 | Birbara et al. | |
| 5,876,488 A | 3/1999 | Birbara et al. | |
| 6,099,621 A * | 8/2000 | Ho ........................ | B01D 53/228 264/212 |
| 6,364,938 B1 | 4/2002 | Birbara et al. | |
| 6,547,854 B1 | 4/2003 | Gray et al. | |
| 6,908,497 B1 | 6/2005 | Sirwardane | |
| 7,288,136 B1 * | 10/2007 | Gray .................. | B01D 53/1475 423/228 |
| 7,605,293 B2 | 10/2009 | Olah et al. | |
| 7,795,175 B2 | 9/2010 | Olah et al. | |
| 8,118,914 B2 | 2/2012 | Liu et al. | |
| 8,212,088 B2 | 7/2012 | Olah et al. | |
| 8,377,173 B2 | 2/2013 | Chuang | |
| 8,440,729 B2 | 5/2013 | Olah et al. | |
| 2002/0001536 A1 | 1/2002 | Asperger et al. | |
| 2006/0246564 A1* | 11/2006 | Parent .................... | B01D 53/84 435/181 |
| 2008/0293976 A1 | 11/2008 | Olah et al. | |
| 2010/0111810 A1* | 5/2010 | Constantz .......... | B01D 53/1418 423/430 |
| 2013/0047849 A1* | 2/2013 | Zhang .................... | B01D 53/02 95/130 |
| 2013/0197235 A1* | 8/2013 | Thompson .............. | C07F 3/003 548/103 |
| 2015/0148439 A1* | 5/2015 | Eddaoudi ................... | C08J 9/36 521/154 |

FOREIGN PATENT DOCUMENTS

WO    2004/054708 A2    7/2004

OTHER PUBLICATIONS

International Search Report and Written Opinion, PCT/US2014/063850, dated Jan. 14, 2015.
International Preliminary Report on Patentability, PCT/US2014/063850, dated Nov. 2, 2015.
Millward et al., "Metal-Organic Frameworks with Exceptionally High Capacity for Storage of Carbon Dioxide at Room Temperature," J. Am. Chem. Soc., 127:17998-17999 (2005).
Satyapal et al., "Performance and Properties of a Solid Amine Sorbent for Carbon Dioxide Removal in Space Life Support Applications," Energy & Fuels, 15:250-255 (2001).

(Continued)

*Primary Examiner* — Christopher P Jones
(74) *Attorney, Agent, or Firm* — Winston & Strawn LLP (57) ABSTRACT

The invention relates to regenerative, solid sorbent for adsorbing carbon dioxide from a gas mixture, with the sorbent including a modified polyamine and a nano-structured solid support. The modified polyamine is the reaction product of an amine and an aldehyde. The sorbent provides structural integrity, as well as high selectivity and increased capacity for efficiently capturing carbon dioxide from gas mixtures, including the air. The sorbent is regenerative, and can be used through multiple operations of absorption-desorption cycles.

15 Claims, 2 Drawing Sheets

(56) References Cited

OTHER PUBLICATIONS

Xu et al., "Novel Polyethylenimine-Modified Mesoporous Molecular Sieve of MCM-41 Type as High-Capacity Adsorbent for CO2 Capture," Energy & Fuels, 16:1463-1469 (2002).

Xu et al., "Preparation and characterization of novel CO2 'molecular basket' adsorbents based on polymer-modified mesoporous molecular sieve MCM-41," Microporous and Mesoporous Materials, 62:29-45 (2003).

Yeh et al., "Study of CO2 Adsorption and Desorption in a Packed Column," Energy & Fuels, 15:274-278 (2001).

* cited by examiner

REGENERATIVE ABSORBENTS OF MODIFIED AMINES ON NANO-STRUCTURED SUPPORTS

This application is a 371 filing of International Patent Application PCT/US2014/063850 filed Nov. 4, 2014, which claims the benefit of application No. 61/910,886 filed Dec. 2, 2013.

FIELD OF THE INVENTION

The invention relates to regenerative nano-structure supported (such as fumed silica, precipitated silica, fumed alumina and the like solid) modified polyamine absorbents for capturing and separating carbon dioxide from gas mixtures, including the air.

BACKGROUND OF THE INVENTION

Climate change and global warming is considered one of today's the most pressing and severe environmental problems. It is now generally accepted that the main cause for global warming is the release of the so-called greenhouse gases into the atmosphere. A major greenhouse gas is carbon dioxide ($CO_2$), which is released predominantly from combustion of fossil fuels such as coal, petroleum and natural gas. Together, these fossil fuels supply about 80% of the energy needs of the world. Because fossil fuels are still relatively inexpensive and easy to use, and since no satisfactory alternatives are yet available to replace them on the enormous scale needed, fossil fuels are expected to remain our main source of energy in the foreseeable future.

One way to mitigate $CO_2$ emissions and their influence on the global climate is to efficiently and economically capture $CO_2$ from its sources, such as from emissions from fossil fuel-burning power plants and other industrial factories, naturally occurring $CO_2$ accompanying natural gas, and the air, and to sequester or convert the $CO_2$ to a renewable fuel.

Among various $CO_2$ collection or separation techniques, amine solution-based $CO_2$ absorption/desorption systems are one of the most suitable for capturing $CO_2$ from high volume gas streams. Commonly used solvents in such systems are aqueous solutions of alkanolamines such as monoethanolamine (MEA), diethanolamine (DEA), diisopropanolamine (DIPA), and methydiethanolamine (MDEA). Certain sterically hindered amines, such as 2-amino-2-methyl-1-propanol (AMP), can also be used as absorbents because of their high $CO_2$ loading capacities. Of these, MEA is most widely used because of its high $CO_2$ absorption rate, which allows use of shorter absorption columns. MEA system presents major drawbacks, however, including the large amount of heat required to regenerate the solvent and operational problems caused by corrosion and chemical degradation. To prevent excessive corrosion, typically only 10 to 30 weight % MEA is used in an aqueous amine solution, with the rest being water. Because the entire solution, of which 70 to 90% is water, must be heated to regenerate the MEA system, a lot of energy is wasted during the regeneration process. Other alkanolamine systems also present disadvantages. For example, secondary and hindered amines (e.g., DEA, DIPA, AMP) provide more moderate $CO_2$ absorption rates than MEA, and are also prone to corrosion and chemical degradation. MDEA is known to absorb $CO_2$ only at a slow rate. Formulations formed by blending several alkanolamines are of interest because they can combine favorable characteristics of various compounds while suppressing in part their unfavorable characteristics. A number of blended alkanolamine solutions have been developed, and the most common blends are MDEA-based solution containing MEA or DEA. However, blended alkanolamine solutions do not eliminate the drawbacks of amine solution-based systems.

$CO_2$ can also be captured by adsorption on solid sorbents. Solids are typically used as physical adsorbents for separation of $CO_2$. Such processes are based on the ability of porous solids to reversibly adsorb certain components in a mixture. The solids can have a large distribution of pore size, as in silica gel, alumina, and activated carbon, or a pore size controlled by the crystal structure, e.g., zeolites. At low temperatures such as room temperature, zeolite-based adsorbents have high $CO_2$ absorption capacities (e.g., 160 mg $CO_2$/g for zeolite 13X and 135 mg $CO_2$/g for zeolite 4 A at 25° C. in pure $CO_2$). However, the adsorption capacities of these adsorbents decline rapidly with increasing temperature and in the presence of water or moisture. Further, because gases are only physically adsorbed on the adsorbents, actual separation of an individual gas from a mixture of gases is low.

To achieve a higher selectivity for $CO_2$ adsorption, a compound providing chemical absorption can be applied on the solid adsorbent. For this purpose, an amine or polyamine can be deposited or grafted onto a solid support. Amines and polyamines chemically bound (grafted) on the surface of solids, such as silicas and alumina-silicas, however, show limited absorption capacity of less than 80 mg $CO_2$/g and, in most cases, less than 50-60 mg $CO_2$/g absorbent. For example, U.S. Pat. No. 5,087,597 to Leal et al. discloses a method for chemisorption of $CO_2$ at room temperature using silica gel having a surface area between 120 and 240 $m^2$/g, which is modified with a polyalkoxysilane containing one or more amino moieties in its structure. The material is disclosed to be capable of absorbing between 15 and 23 mg of dry $CO_2$ per gram of absorbent. U.S. Pat. No. 6,547,854 to Gray et al. discloses a method for preparing amine-enriched sorbents by incorporating the amine onto the surface of oxidized solids. The reported maximum amount of $CO_2$ absorbed on these solids is 7.7 mg/g absorbent using a gas mixture of 10% $CO_2$ in He. As is evident from the data, the amount of $CO_2$ that can be absorbed on the grafted amino group on various solid supports remains relatively low, because of their low amine coverage.

Another pathway involves impregnating a solid support with amines or polyamines. For example, a paper by S. Satyapal et al., *J. Energy and Fuels* 15:250 (2001) describe the development of polyethylenimine (PEI)/polyethylene glycol (PEG) on a high surface area polymethylmethacrylate polymeric support. This solid was developed to be used in space shuttles to remove $CO_2$ from the cabin atmosphere and release it into space. Its capacity is approximately 40 mg $CO_2$/g absorbent at 50° C. and 0.02 atm. $CO_2$. This material and its modifications are disclosed in U.S. Pat. Nos. 6,364,938; 5,876,488; 5,492,683; and U.S. Pat. No. 5,376,614 to Birbara et al. The preferred supports described in these patents are of polymeric nature, with acrylic ester resins such as AMBERLITE® being described as having particularly suitable characteristics. U.S. Pat. Nos. 5,376,614; 5,492,683; and 5,876,488 also disclose other possible supports, including alumina, zeolite and carbon molecular sieves. According to U.S. Pat. Nos. 5,492,683 and 5,376,614, however, the amount of amine present on the sorbent is limited, ranging from 1 wt. % to 25 wt. %.

U.S. Pat. No. 4,810,266 to Zinnen et al. discloses a method for creating $CO_2$ sorbents by treating carbon molecular sieves with amine alcohols. This patent discloses that monoethanolamine (MEA)-based materials are not stable and release MEA during the regeneration step at higher temperatures. International Publication No. WO 2004/054708 discloses absorbents based on mesoporous silica supports. The active components for $CO_2$ absorption are amines or mixture thereof chemically connected or physically adsorbed on the surface of the mesoporous silicas. Absorption on most of the absorbents described in this publication is below 70 mg $CO_2$/g. The best results are obtained by using diethanolamine (DEA), which is physically adsorbed on the support (about 130 mg $CO_2$/g). However, because of the volatility of DEA under the desorption conditions, the effectiveness of this absorbent generally decrease with increasing number of $CO_2$ absorption-desorption cycle (about 16.8% after 5 cycles at a moderate regeneration temperature of only 60° C.). U.S. Pat. No. 6,908,497 to Sirwardane et al. discloses a method for preparing sorbents by treating a clay substrate having a low surface area of 0.72 to 26 $mg^2$/g with an amine and/or ether.

Alcohols, polyethylene glycol and other oxygenated compounds have also been used for decades for acid gas removal, mainly $CO_2$ and $H_2S$. For example, SELEXOL® from Union Carbide (now Dow Chemicals) and SEPASOLV MPE® from BASF are used in commercial processes. Oxygenated compounds in combination with amines as mixed physical or chemical sorbents, in a process such as a glycol-amine process, have also been used for many years for acid gas removal (see Kohl, A. L. and Nielsen, R. B., GAS PURIFICATION 5th ed. (Gulf Publishing Co.)). U.S. Pat. No. 4,044,100 to McElroy demonstrates the use of mixtures of diisopropanolamine and dialkyl ethers of a polyethylene glycol for removing gases, including $CO_2$ from gaseous streams. The use of ethylene glycol to improve the absorption and desorption of $CO_2$ from amines has also been studied by J. Yeh et al., *Energy and Fuels* 15, pp. 274-78 (2001). While the literature mainly relates to the use of amines and oxygenated compounds in the liquid phase, the use of oxygenated compounds to improve characteristics of gas sorbents in the solid phase has also been explored. S. Satyapal et al., *Energy and Fuels* 15:250 (2001) mentions the use of polyethylene glycol in conjunction with polyethyleneimine on a polymeric support to remove $CO_2$ from the closed atmosphere of a space shuttle. X. Xu et al., *Microporous and Mesoporous Materials* 62:29 (2003) shows that polyethylene glycol incorporated in a mesoporous MCM-41/polyethyleneimine sorbent improves the $CO_2$ absorption and desorption characteristics of the tested material. Preparation and performance of a solid absorbent consisting of PEI deposited on a mesoporous MCM-41 is also disclosed (see X. Xu et al., *Energy and Fuels* 16:1463 (2002)). U.S. Pat. Nos. 5,376,614 and 5,492,683 to Birbara et al. use polyols to improve absorption and desorption qualities of the absorbents.

Another new material for trapping carbon dioxide are metal organic framework compounds. A preferred compound known as MOF-177 (J. Am. Chem. Soc., 2005, 127, 17998) has a room temperature carbon dioxide capacity of 140 weight percent at a relatively high pressure of 30 bar.

Yet another adsorbent for this purpose is a supported amine sorbent comprising an amine or an amine/polyol composition deposited on a nano-structured support, which provide structural integrity and increased $CO_2$ absorption capacity. This material is disclosed in U.S. Pat. No. 7,795,175. The support for the amine and amine/polyol compositions is composed of a nano-structured solid. The nano-structured support can have a primary particle size less than about 100 nm, and can be nanosilica, fumed or precipitated oxide, calcium silicate, carbon nanotube, or a mixture thereof. The amine can be a primary, secondary, or tertiary amine or alkanolamine, aromatic amine, mixed amines or combinations thereof. In an example, the amine is present in an amount of about 25% to 75% by weight of the sorbent. The polyol can be selected from, for example, glycerol, oligomers of ethylene glycol, polyethylene glycol, polyethylene oxides, and ethers, modifications and mixtures thereof, and can be provided in an amount up to about 25% by weight of the sorbent.

Despite these prior disclosures, there still remains a need for an improved sorbent for capturing $CO_2$, which is efficient, economical, readily available and regenerative, and which provides a high removal capacity at ambient as well as elevated temperatures. The present invention now provides such a material.

SUMMARY OF THE INVENTION

The invention provides a new solid sorbent for absorbing carbon dioxide from a gas mixture, comprising a modified polyamine and a nano-structured solid support. As disclosed herein, the modified polyamine is the reaction product of an amine and an aldehyde.

The nano-structured support advantageously has a primary particle size less than about 100 nm and preferably between 3 and 50, 3 and 30 or 3 and 15 nm. The support is typically silica, silica-alumina, calcium silicate, carbon nanotube, or a mixture thereof.

The modified polyamine is obtained as a viscous liquid by dissolving the amine in water to form an amine solution; adding the aldehyde to the amine solution with agitation or stirring with or without heating to form a mixture for a period of time to form a liquid reaction product of the amine and aldehyde; and then heating the mixture, if necessary under vacuum conditions, to remove water. The amine is a primary, secondary or tertiary alkyl- or alkanolamine, an aromatic amine, a mixed amine, polyamine, a mixture of polyamines, or a combination and/or modification thereof, while the aldehyde is a simple aldehyde, dialdehyde, trialdehyde, a polymeric aldehyde compound or a mixture thereof. A preferred polyamine is tetraethylenepentaamine, pentaethylenehexamine, triethylenetetramine, diethylenetriamine, ethylenediamine, hexaethyleneheptamine, a polyethylenimine, or a combination thereof, while a preferred aldehyde is formaldehyde, glyoxal (ethanedial), glutaraldehyde (pentane-1,5-dial), succindialdehyde (butanedial), o-phthalaldehyde, m-phthalaldehyde, p-phthalaldehyde or a mixture thereof. In the sorbent the modified polyamine is present in an amount of about 25% to 75% or 40% to 60% or in an approximately equal amount by weight of the support.

In another embodiment, the sorbent further comprises a polyol in an amount of 1% up to about 25% by weight of the sorbent. Typically, the polyol is selected from the group consisting of glycerol, oligomers of ethylene glycol, polyethylene glycol, polyethylene oxides, and ethers, modifications and mixtures thereof. In particular, when the nano-structured support is nanosilica, the modified amine may be present in an amount of about 25% to 75% by weight of the sorbent, and the sorbent further comprises polyethylene glycol in an amount of 1% up to 25% by weight of the sorbent.

The invention also relates to a method for preparing these sorbents, by combining the amine, aldehyde and support in a solvent with mixing and heating for a sufficient time to allow the amine and aldehyde to combine and be provided upon the support, followed by removal of the water to obtain the sorbent as a solid.

In one embodiment of the method, wherein the nano-structured support is dispersed in the solvent to form a suspension; the amine is dissolved in the solvent to form an amine solution; the aldehyde is dissolved in a solvent to form an aldehyde solution; and the suspension and the amine and aldehyde solutions are combined. This can be conducted by dissolving the amine in water to form an amine solution, adding an aqueous solution of the aldehyde to the amine solution to form a mixture; mixing the mixture at a temperature of 15 to 100° C. for 5 mins to 50 hrs; then heating the mixture to at least 100° C. for 30 seconds to 60 minutes to remove part or all of the water, with any remaining water removed by heating under vacuum, to obtain the modified polyamine as a viscous liquid.

Subsequently, the sorbent is formed by adding the viscous liquid to the dispersion of the support with stirring to disperse the modified polyamine onto the support.

In another embodiment, the method further comprises adding a polyol before the removal of water for the obtention of the sorbent. In particular, the method further comprises adding a polyol to the suspension; drying the suspension after the addition of the polyol to form a supported polyol; dispersing the supported polyol in the solvent; and combining the dispersed supported polyol and the amine solution prior to removing the solvent to form the sorbent.

The invention also relates to a method of capturing and separating carbon dioxide from a gas source by absorbing the carbon dioxide on the sorbent. The sorbent is regenerative in that it can be desorbed and regenerated by applying heat, reduced pressure, vacuum, gas purge, lean sweep gas, or a combination thereof. In this regard, the invention also relates to the use of a modified polyamine to provide a solid sorbent for absorbing carbon dioxide from a gas mixture, characterized in that the modified polyamine is the reaction product of an amine and an aldehyde and is provided upon a nano-structured solid support.

The released carbon dioxide can be used in a method to produce a renewable fuel such as methanol. In one embodiment, this method comprises reduction of carbon dioxide and water, or reduction of carbon dioxide under conditions sufficient to produce methyl formate as an intermediate compound followed by catalytic hydrogenation of the intermediate compound with hydrogen to form methanol.

In another embodiment, methanol is produced by catalytic hydrogenation of the intermediate compound wherein the hydrogen used in the hydrogenation is obtained by electrolysis of water obtained from the air. In another embodiment, methanol is produced by reducing the carbon dioxide under conditions sufficient to carbon monoxide, reacting the carbon monoxide with methanol under conditions sufficient to obtain methyl formate, and catalytically hydrogenating the methyl formate under conditions sufficient to produce methanol.

Methanol produced according to the invention can be further processed to any desired derivative or modified compounds. For example, methanol can be dehydrated to produce dimethyl ether, which can also be further treated under conditions sufficient to form compounds such as ethylene and propylene. Ethylene and propylene can be converted to higher olefins, a synthetic hydrocarbons, aromatics, or related products, and therefore are useful as a feedstock for chemicals or as transportation fuel. In a further embodiment, methanol can be further used for microbiological production of single cell proteins.

DETAILED DESCRIPTION OF THE PREFERRED EMBODIMENTS

The invention relates to regenerative supported modified polyamine sorbents for absorbing $CO_2$. The sorbent comprises a modified polyamine on a nano-structured support, e.g., a nanosilica support, for absorbing and desorbing $CO_2$. $CO_2$ can be absorbed from any desired source, including industrial exhausts, flue gases of fossil fuel-burning power plants, as well as natural sources. The nano-structured support according to the invention provides structural integrity to the polyamine as well as a high surface area for solid-gas contact.

The modified polyamine sorbent with nano-scale support according to the invention provides significant advantages over the absorbents of the prior art, e.g., absorbents having a polymeric support, including a high $CO_2$-selectivity and removal capacity at ambient and elevated temperatures. Thus, the present sorbent allows selective capture and separation of $CO_2$ from various gas mixtures under various conditions and temperatures.

The present sorbent is also easy to regenerate and recycle at ambient to moderate temperatures, enabling multiple absorption-desorption cycles with no or minimal loss of activity. The sorbent also addresses the corrosion and evaporation problems of the prior art absorbents.

Thus, the present sorbent system is practical for separating $CO_2$ from industrial effluent gases such as those from fossil fuel-burning power plants and other industrial factories, as well as other gas streams, particularly natural gas containing significant $CO_2$ concentrations. Significantly, the sorbent can also be used to separate $CO_2$ from the atmospheric air.

The sorbent according to the invention is suggested to absorb $CO_2$ by the following mechanism. Upon contact with a gaseous stream containing $CO_2$, the supported modified amine chemically absorbs $CO_2$ by forming a carbamate complex.

Carbamate

In the presence of water, the carbamate further reacts to form a bicarbonate and releases the amine, which can further react with $CO_2$, thereby increasing the overall $CO_2$ absorption capacity.

$$R_1R_2N\,CO_2^- \cdot {}^+H_2NR_1R_2 + H_2O \rightleftharpoons HCO_3^- \cdot {}^+H_2NR_1R_2 + R_1R_2NH$$
Bicarbonate According to an embodiment of the invention, the absorbed CO₂ can be readily desorbed and the supported modified polyamine can be regenerated. The desorption of $CO_2$ and regeneration of the sorbent can be achieved by modest heating of the sorbent, applying reduced pressure or vacuum, gas purge, and/or a carbon dioxide lean sweep gas, which releases $CO_2$ from the sorbent. The ready regeneration enables the sorbent to undergo repeated absorption-desorption cycles with ease.

A large variety of amines can be used in the present invention. Suitable amines include primary, secondary and tertiary alkyl- and alkanolamines, aromatics, mixed amines, polyamines, mixture of polyamine and combinations and modifications thereof. Primary and secondary amines are the most active for $CO_2$ absorption. The polyamine should, therefore, preferably contain a sufficient amount of primary and secondary amino components. Specific examples of amino components include, but are not limited to, tetraethylenepentaamine, pentaethylenehexamine, triethylenetetramine, diethylenetriamine, ethylenediamine, hexaethyleneheptamine, polyethylenimines, and the likes, including various polymeric amine compounds and mixtures thereof.

Preferred polyamines include various higher ethyleneamines which are sometimes referred to as polyethyleneamines. A general formula for such polyamines is: $H_2N(NH(CH_2)_n)_pNH_2$ where n is 1 to 4 and p is 2 to 10000. The polyamine preferably contains a sufficient amount of repeating $NH(CH_2CH_2)$ units so that they possess low volatility to avoid or minimize loss of amine, which would contaminate the gas stream and decrease the effectiveness of the absorption system over time. Specifically preferred linear polyamines include tetraethylenepentaamine (TEPA) and pentaethylenehexamine (PEHA) and hexaethyleneheptamine (HEHA).

Aldehydes that can be used in this invention to modify the amine include single aldehydes, as well as dialdehydes, trialdehydes and higher homologues. Examples of aldehyde components include, but are not limited to, formaldehyde, glyoxal (ethanedial), glutaraldehyde (pentane-1,5-dial), succindialdehyde (butanedial), o-phthalaldehyde, m-phthalaldehyde, p-phthalaldehyde, and the likes, including various polymeric aldehyde compounds and mixtures thereof.

The support according to the invention is a support having primary particle sizes less than 1,000 nm, preferably less than about 100 nm. Preferred supports are nanosilica, especially so-called fumed silica and precipitated silica. Fumed silica typically has a primary particle size ranging from 5 to 50 nm and a specific surface area between 50 and 500 m²/g. Fumed silica is generally prepared by vapor phase hydrolysis of a silicon-bearing halide, such as silicon tetrachloride ($SiCl_4$). Examples of commercially available fumed silica include AEROSIL® from Evonik, CAB-O-SIL® from Cabot, and REOLOSIL® from Tokuyama. Precipitated silica is formed from aqueous solutions by reaction of an alkaline silicate (e.g., sodium silicate) with a mineral acid (e.g., sulfuric acid) under stirring. Primary particles formed by this method are generally between 3 and 50 nm, more specifically between 3 and 30 nm and preferably are between 3 and 15 nm in size. These primary particles can subsequently aggregate to form larger micron size particles. The specific surface area of precipitated silica generally ranges from 50 to 500 m²/g. Examples of commercially available precipitated silica include HI-SIL® from PPG Industries, SIPERNAT® from Evonik and FINESIL® and TOKUSIL® from Tokuyama.

Fumed silica and precipitated silica have the appearance of a lightweight, fluffy, white powder. Their small particle size allows them to absorb and retain significant amounts of amines while maintaining free flowing powder characteristics without caking. Another advantage of fumed and precipitated silicas is their non-toxicity. The non-toxicity allows them to be used in food processing, e.g., as anti-caking additives in powdered food products such as milk substitutes, and in cosmetic products, e.g., in abrasive material in a toothpaste. Fumed and precipitated silicas are generally hydrophilic, but their surface can be treated to produce hydrophobic silicas. Both hydrophilic and hydrophobic silicas, as well as other modified silicas, are all suitable for use as the nano-structured polyamine support according to the invention.

Other nano-structured materials suitable for use in the present polyamine sorbents include fumed or precipitated oxides such as fumed aluminum oxide, fumed zirconium oxide, and fumed titanium oxide, precipitated aluminum oxide, precipitated titanium oxide, precipitated zirconium oxide, calcium silicate, carbon nanotubes, and mixtures thereof.

The supported polyamine sorbent can be prepared by impregnation or by another conventional technique.

To enhance the $CO_2$ absorption and desorption characteristics of the supported amine sorbent, polyols may be incorporated in the sorbent composition, in an amount up to 25% of the total weight of the sorbent. The additions of polyols improves the absorption and desorption of the sorbent, and decreases the viscosity of the amines, allowing $CO_2$ to have better access to the active amino sites of the sorbent even at lower temperatures (<50° C.). Polyols used in the invention should be unreactive toward amines, and should have low volatility to avoid or minimize loss, which contaminates the gas stream and decreases the effectiveness of the absorption system over time. Examples of polyols used in the present sorbent include but are not limited to glycerol, oligomers of ethylene glycol, polyethylene glycols, polyethylene oxides, ethers of oligomers of ethylene glycol, ethers of polyethylene glycols, ethers of polyethylene oxides, oligomers or polymers of cyclic ethers such as polytetrahydrofuran, and modifications and mixtures thereof. Preferred polyols have a molecular weight lower than 10,000. More preferably, polyols have a molecular weight lower than 1,000.

The methods for preparing polyamine supported sorbents according to the invention are inexpensive and easy to carry out, yet produce sorbents that are superior to the sorbents prepared by previously known methods.

For example, the modified polyamine can be prepared by first dissolving the amine in water to form an amine solution. Next an aqueous solution an aldehyde is added to the amine solution to form a mixture. The mixture is initially stirred at room temperature (i.e., 15 to 100° C.) for 1 min to 50 hrs and preferably 1 to 30 hrs and then is heated to at least 100° C. for 30 seconds to 300 minutes and preferably from 10 to 60 minutes to remove part or all of the water. Any remaining water can be removed by heating under vacuum. The obtained modified amine is a viscous liquid.

To form the sorbent, the viscous liquid can be dissolved in water and added to the support (e.g., silica) in suspension in water with stirring to disperse the modified polyamine onto the support. The amount of viscous liquid would be between 25 and 75% or between 40 and 60% of the combined weight of the viscous liquid and support: preferably approximately equal weights of these are used. Thereafter, the water can be removed as described above. The supported modified polyamine sorbent can be obtained as a solid, which could be crushed and sieved to produce a uniform powder for use the absorption of carbon dioxide.

Alternatively, the modified amine and sorbent can be prepared together by mixing the amine and silica into water as noted above, followed by the addition of a solution of the aldehyde to prepare a mixture. Stirring or agitation of the mixture is maintained to form the sorbent and then the water is removed to obtain the sorbent as a powder like solid.

As noted above, polyols can be added to enhance the absorption/desorption characteristics of the supported amine sorbent. When a polyol is used, the polyol can be mixed together with the amine solution and added to the suspension of the support. The polyol can also be separately dissolved in the solvent and combined with the suspension of the support. In that case, the polyol solution is preferably added first to the suspension of the support, and the solvent is then removed to obtain the supported polyol material. The obtained solid is then dispersed in the solvent and a solution of the amine in the solvent is added under stirring. Finally, solvent is removed to form the supported amine/polyol sorbent. The sorbent can be used as is or can be crushed and sieved to obtain a uniform powder.

Any solvent which is capable of dissolving, but which does not react with, the amine and the polyol can be utilized. The solvent should preferably be easily separated from the sorbent by mild heating and/or vacuum. Preferred solvents include but are not limited to alcohols, which can dissolve amines and polyols and can be easily removed from the sorbent. For example, methanol, ethanol, and isopropyl alcohol, and various mixtures thereof can be used. The preferred solvent is water.

Advantageously, the invention enables a wide range of $CO_2$ absorbing capabilities for use with various natural and industrial gas sources. The absorption can be performed under various conditions, e.g., over a temperature range of 0 to 100° C., and in any suitable manner, e.g., in a regular flow system or in a fixed, moving, or fluidized absorption bed. The ability of the sorbent to capture $CO_2$ can be demonstrated by measuring absorption by thermogravimetry using a thermogravimetric analyzer (TGA), in a flow system over a sorbent cartridge or by measuring $CO_2$ absorption under static conditions.

Once the bulk of the amines is complexed with $CO_2$, the sorbent can be regenerated. As used herein, the term "regeneration" or "regenerative" is understood to mean that the sorbent can be re-used by releasing or desorbing the absorbed gas from the sorbent. The absorbed gas is released by treating the sorbent with any process that effects the release, e.g., heating, reduced pressure, vacuum, gas purge, and combinations thereof. Thus, the regenerated sorbent according to the invention can be used repeatedly, through multiple absorption-desorption cycles. In an example, the sorbent maintains its absorption efficiency even after repeated absorption-desorption cycles. Preferably, the sorbent maintains its absorption efficiency for many absorption-desorption cycles. It is convenient to use parallel absorption beds, which allow absorption and desorption/regeneration to be carried out continuously.

For example, for a $CO_2$ sorbent, the regeneration is endothermic, so the absorbed $CO_2$ is released by subjecting the absorbent to elevated temperature (e.g., by heating the sorbent at temperatures from about 25° C. to about 85° C.), reduced pressure (e.g., by pressure swing absorption (PSA)), gas purge, vacuum, lean gas sweep, or any combinations thereof. The regeneration treatment allows essentially most of the $CO_2$ that is complexed with the polyamine of the sorbent to be released. The $CO_2$ can then be released, stored or used in any desired manner, and the sorbent freed (regenerated) from $CO_2$ is reused in further $CO_2$ absorption-desorption cycles.

Uses and reactions of $CO_2$ include those mentioned above and as further disclosed in co-pending U.S. Pat. Nos. 7,605, 293, 8,212,088 and 8,440,729, among others. The entire content of these three patents is expressly incorporated herein by reference thereto.

The sorbent according to the invention is thermally stable and does not release the supported polyamine in the temperature and/or pressure range of the absorption operation. Further, because it is capable of regeneration and effective operation at a temperature range that can be easily maintained throughout the process, the sorbent is cost-effective for providing a high efficacy and a long life span, in addition to a high selectivity and capacity for $CO_2$ capture and separation. Because of its flexibility and versatility, the sorbent can also advantageously be used to treat large volumes of $CO_2$-containing gases from various sources.

It is generally observed that primary amines are more reactive than secondary amines towards $CO_2$ and bind $CO_2$ more strongly than secondary amine. While this could be an advantage during the $CO_2$ adsorption step it also means that more energy is needed during the regeneration (desorption) step to liberate the adsorbed $CO_2$ which could possibly lead to slower desorption kinetics. To lower the energy requirements during the regeneration step, the utilization of polyamines containing only or mostly secondary amines could therefore be advantageous.

Aldehydes react preferentially with primary amines to form imines. In the presence of formaldehyde containing no alpha-hydrogen the reaction with a primary amine results in the introduction of a —$CH_2$—OH group and the formation of a secondary amine. Further reaction with another primary amine from another polyamine molecule can lead to oligomerization by a condensation reaction and elimination of water.

The elimination of part or all of the primary amines, or transformation of the primary amines into secondary amines, in polyamines results in the formation of a modified polyamine with improved $CO_2$ desorption characteristics requiring a lower energy input during the regeneration step. Thus the desorption step could for example be performed at a significantly lower temperature and/or in a shorter time period, decreasing the overall cost and time of the process. The adsorbents described in this patent offer a substantial improvement compared to the present state of the art.

EXAMPLES

The following examples are illustrative only and should not be interpreted as limiting the scope of the invention.

Example 1: Preparation of a Regenerable $CO_2$ Adsorbent

An absorbent according to the invention is conveniently prepared in two steps.

Step 1: Preparation of a Modified Polyamine Species

A modified polyamine species based on pentaethylenehexamine (PEHA), H(NHCH$_2$CH$_2$)$_5$NH$_2$, and formaldehyde is prepared as follows. 30 g of PEHA was dissolved in water. 10.45 g of an aqueous solution of formaldehyde (37% formaldehyde in water) diluted in 20 mL of water was then added drop-wise to the PEHA solution. The mixture was stirred for 20 hours at room temperature. After that, the temperature was progressively raised to 100° C. and kept at that temperature for 90 minutes to remove parts of the water. The remaining water was removed by heating under vacuum on a rotavap followed by overnight vacuum (<1 mm Hg). The obtained product was a viscous yellow to orange liquid. The modified polyamine was named PEHA-HCHO-1-1.

Step 2: Preparation of a Supported Polyamine Sorbent

A supported modified polyamine sorbent composed of 50 wt. % PEHA-HCHO-1-1 and 50 wt. % fumed silica having an average primary particle size of 7 nm and a specific surface area of 390 m$^2$/g+/−40 m$^2$/g.

PEHA-HCHO-1-1 was dissolved in 100 mL of water. This solution was then added slowly under stirring to an equal amount of fumed silica in suspension in 300 mL water to ensure good dispersion of the modified polyamine on the support. The mixture was stirred for an additional 20 hours at room temperature, and the water was then removed from the mixture by heating under vacuum on a rotavap followed by overnight vacuum (<1 mm Hg). The supported polyamine sorbent obtained was a white solid, which could be crushed and sieved to produce a uniform powder.

Example 2: Preparation of Adsorbent Based on Modified Polyamines and Fumed Silica This example illustrates the preparation in "one pot" of a supported modified polyamine sorbent composed of 53 wt. % PEHA-HCHO-1-1 and 47 wt. % fumed silica having an average primary particle size of 7 nm and a specific surface area of 390 m$^2$/g+/−40 m$^2$/g 30.1 g (0.1295 mol) of PEHA was dissolved in 120 mL of water. This solution was then added under stirring to 30.1 g of fumed silica in suspension in 300 mL of water to ensure good dispersion of PEHA on the support. Stirring was maintained for 1 hour before 10.5 g (0.1295 mol) of an aqueous solution of formaldehyde (37% formaldehyde in water) was added drop-wise to the PEHA/fumed silica solution (rate of addition of 0.3 mL/min) at room temperature. The mixture was stirred for an additional 20 hours. The water was removed by heating under vacuum on a rotavap followed by overnight vacuum (<1 mm Hg). The obtained product was a white powder like solid.

Example 3: Measurement of CO$_2$ Absorption Capacity Using an Adsorbent Placed in a Cartridge in a Flow System. CO$_2$ Adsorption from a Mixture Containing 1000 ppm CO$_2$ and 50% Humidity for Air Quality Purposes This example illustrates the removal of CO$_2$ from a gas mixture containing 1000 ppm CO$_2$ in air for indoor air quality purposes. The adsorbent used was PEHA-HCHO-1-1/precipitated silica (53/47 wt % prepared in "one pot").

CO$_2$ adsorption data were obtained using an all-glass grease free flow system. The adsorbent, generally 1 g was placed in a glass tube between two glass wool plugs. The U-tube was then evacuated (~30 mTorr) at 85° C. for 3 hours. The weight of the adsorbent after this treatment was measured. The adsorbent weight after pretreatment was used for the later calculation of the CO$_2$ adsorption capacities.

After pretreatment the adsorbent containing U-tube was placed in a thermostated oil bath at 25° C. For the adsorption measurements a Horiba VIA-510 CO$_2$ analyzer equipped with an IR detector specifically intended for CO$_2$ measurements was placed in-line with the adsorption setup. The concentration range used was 0-2000 ppm. Before each run, the analyzer was calibrated with reference gases; CO$_2$ in air and ultra zero grade air for the zero. An air mixture containing 1000 ppm CO$_2$ and 50% moisture was used for the adsorption measurements. The air flow (~335 mL/min) was then opened on the adsorbent bed. Almost immediately the CO$_2$ concentration in the gas outlet fell to 0 ppm, signaling complete CO$_2$ adsorption from the air. The CO$_2$ concentration was recorded as a function of time via LabView 8.6. After an initial period at 0 ppm CO$_2$, the concentration in the outlet gas started to increase. After saturation of the adsorbent, when the CO$_2$ concentration reached the inlet value (1000 ppm), the gas flow was stopped. The total adsorption capacity was determined to be 106 mg CO$_2$/g adsorbent (2.4 mmol CO$_2$/g adsorbent).

The desorption of the CO on the adsorbent was performed by heating the adsorbent containing U-tube to 60° C. and then passing a flow of air containing 400 ppm CO$_2$ and 50% humidity (335 ml/min) through it. The CO$_2$ concentration was recorded as a function of time via LabView 8.6. Immediately after opening of the air flow onto the saturated adsorbent the concentration in CO$_2$ spiked to 3-5% CO$_2$ and then slowly decreased until reaching the inlet CO$_2$ concentration (400 ppm CO$_2$).

The adsorption/desorption cycling was repeated 4 times under these conditions (adsorption at 25° C., 1000 ppm CO$_2$ in air, 50% humidity, 335 mL/min and desorption at 60° C., 400 ppm CO$_2$ in air, 50% humidity, 335 mL/min). The adsorption capacity remained stable at around 95-105 mg CO$_2$/g adsorbent.

Example 4: Measurement of CO$_2$ Absorption Capacity by Thermogravimetric Analysis. CO$_2$ Adsorption from a Mixture Containing 1000 ppm CO$_2$ for Air Quality Purposes CO$_2$ absorption data was obtained using a thermogravimetric analyzer (Shimadzu TGA-50). The absorbent (5-20 mg) was loaded into a platinum crucible and placed on the instrument balance. The solid absorbent was then pretreated at the desired temperature, generally 90 to 110° C. for 1 hr. under a flow of air. Subsequently, the sample was cooled to the desired adsorption temperature and the gas flow switched to a gas mixture containing 1000 ppm CO$_2$ in air. The change in mass in the sample was recorded over time to determine the CO$_2$ adsorption capacity. Desorption was performed by heating the adsorbent to a higher temperature (generally 50 to 80° C.) in a gas mixture containing 400 ppm CO$_2$ air. The change in mass in the sample was recorded over time to determine the CO$_2$ desorption capacity. These adsorption/desorption cycles were repeated a number of times to determine the stability of the adsorbent.

Figure 1:
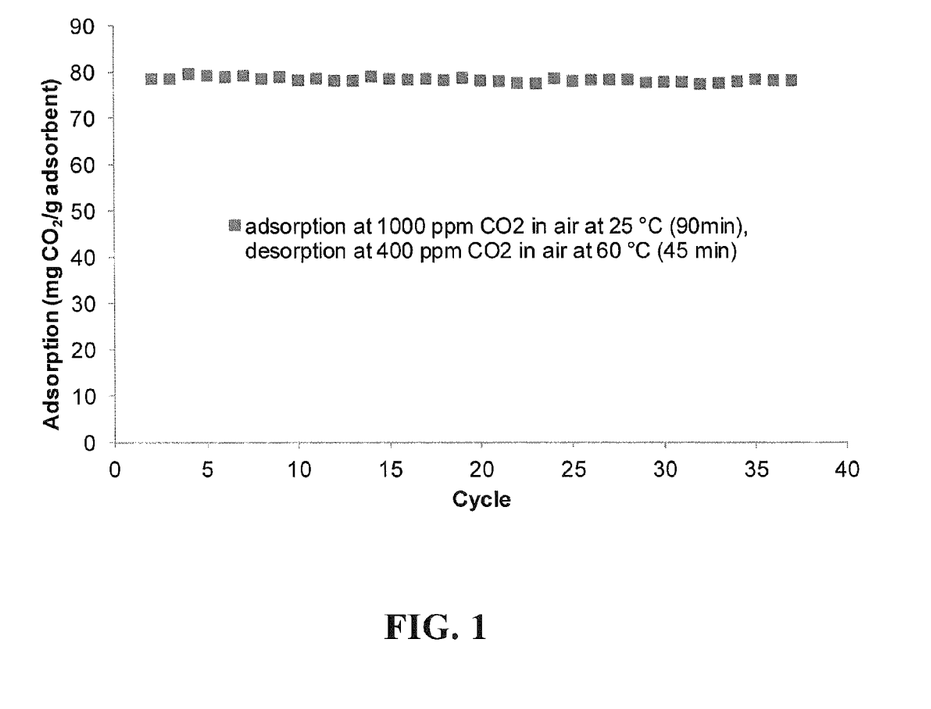
FIG. 1 is a graph of the adsorption and desorption of $CO_2$ on a sorbent based on pentaethylenehexamine formaldehyde named PEHA-HCHO-1-1 (see Example 1) which is supported by precipitated silica, 53/47 wt %, and with the adsorption/desorption measured by a thermogravimetric analyzer.
Figure 2:
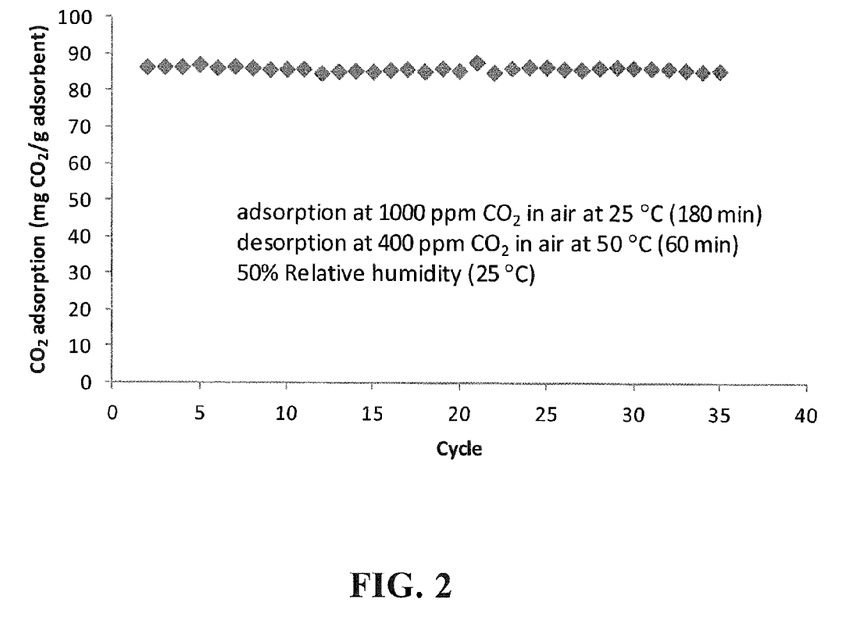
FIG. 2 is a graph of the adsorption and desorption of $CO_2$ under humid conditions on a sorbent based on pentaethylenehexamine/formaldehyde sorbent named PEHA-HCHO-1-1 (see Example 1) supported on precipitated silica, 53/47 wt %, and with adsorption/desorption measured in flow system.

An example of adsorption/desorption measurements obtained with this method for the adsorbent prepared according to the "one pot" synthesis (PEHA-HCHO-1-1/precipitated silica, 53/47 wt %) is presented in FIG. 1. The adsorption was performed at 25° C. for 90 minutes in a gas mixture containing 1000 ppm CO$_2$ in air. Desorption was performed at 60° C. for 45 minutes in a gas mixture containing 400 ppm CO$_2$. The adsorption capacity did not decrease over more than 35 adsorption/desorption cycles and remained around 79 mg CO$_2$/g adsorbent.

What is claimed is:

1. A solid sorbent for adsorbing carbon dioxide from a gas mixture, comprising a modified polyamine that is supported upon and within a nano-structured solid support, wherein the modified polyamine is the reaction product of an amine and an aldehyde and is present in an amount of at least 25% by weight of the sorbent.

2. The sorbent according to claim 1, wherein the nano-structured support is a silica, silica-alumina, calcium silicate, carbon nanotube, carbon or a mixture thereof and has a primary particle size less than about 100 nm and preferably between 3 and 50, 3 and 30 or 3 and 15 nm.

3. The sorbent according to claim 1, wherein the amine is a primary, secondary or tertiary alkyl- or alkanolamine, an aromatic amine, a mixed amine, or a combination thereof, and wherein the aldehyde is a simple aldehyde, dialdehyde, trialdehyde, a polymeric aldehyde compound or a mixture thereof.

4. The sorbent according to claim 1, wherein the amine is tetraethylenepentamine, pentaethylenehexamine, triethylenetetramine, di ethylenetriamine, ethylenediamine, hexaethyleneheptamine, a polyethylenimine, or a combination thereof, and wherein the aldehyde is formaldehyde, glyoxal (ethanedial), glutaraldehyde (pentane-1,5-dial), succindialdehyde (butanedial), o-phthalaldehyde, m-phthalaldehyde, p-phthalaldehyde or a mixture thereof.

5. The sorbent according to claim 1, in which the modified polyamine is present in an amount of 25% to 75% or 40% to 60% of the sorbent or in an approximately equal amount by weight as the support.

6. The sorbent according to claim 1, which further comprises a polyol in an amount up to about 25% by weight of the sorbent, wherein the polyol is selected from the group consisting of glycerol, oligomers of ethylene glycol, polyethylene glycol, polyethylene oxides, and ethers, modifications and mixtures thereof.

7. The sorbent according to claim 1, wherein the nano-structured support is nanosilica, the modified amine is the reaction product of an ethyleneamine of the formula $H_2N(NH(CH_2)_n)_pNH_2$ where n is 1 to 4 and p is 2 to 10000, with an aldehyde of formaldehyde, glyoxal (ethanedial), glutaraldehyde (pentane-1,5-dial), succindialdehyde (butanedial), o-phthalaldehyde, m-phthalaldehyde, p-phthalaldehyde or a mixture thereof, and is present in an amount of about 25% to 75% by weight of the sorbent, and the sorbent further comprises polyethylene glycol in an amount up to 25% by weight of the sorbent.

8. A method for preparing the sorbent of claim 1, which comprises combining the amine, aldehyde and support in a solvent with mixing and heating for a sufficient time to allow the amine and aldehyde to combine with their reaction product being provided upon and within the support, followed by removal of the water to obtain the sorbent as a solid.

9. The method of claim 8, wherein the nano-structured support is dispersed in the solvent to form a suspension; the amine is dissolved in the solvent to form an amine solution; the aldehyde is dissolved in a solvent to form an aldehyde solution; and the suspension and the amine and aldehyde solutions are combined in a mixture with agitation or stirring for a period of time to form a liquid reaction product of the amine and aldehyde; and the water is then removed by heating the liquid reaction product, if necessary under vacuum conditions.

10. The method of claim 8, which further comprises dissolving the amine in water to form an amine solution, adding an aqueous solution of the aldehyde to the amine solution to form a mixture; mixing the mixture at a temperature of 15 to 30° C. for 1 to 50 hours; then heating the mixture to at least 100° C. for 30 seconds to 60 minutes to remove part or all of the water, with any remaining water removed by heating under vacuum, to obtain the modified amine as a viscous liquid, wherein the sorbent is formed by adding the viscous liquid to the support and solvent with stirring to disperse the modified polyamine onto and within the support.

11. The method according to claim 8 which further comprises adding a polyol before the removing water to obtain the sorbent, wherein the polyol is added to the support to form a supported polyol; the supported polyol is suspended in the solvent; and the supported polyol and solvent are combined with the modified amine prior to removing the solvent to form the sorbent.

12. A method for continuously capturing and separating carbon dioxide from a gas mixture with a sorbent, which comprises exposing the sorbent according to claim 1 to the gas mixture to effect absorption of carbon dioxide by the sorbent and treating the sorbent that contains absorbed or entrapped carbon dioxide to release it as purified carbon dioxide.

13. The method according to claim 12, wherein the sorbent is provided in a fixed, moving, or fluidized bed and the gas and bed are in contact for a sufficient time to trap the carbon dioxide in the sorbent, wherein, to release a substantial amount or all of the adsorbed carbon dioxide, the sorbent is treated with sufficient heat, reduced pressure, vacuum, gas purge, or a combination thereof.

14. The method according to claim 12, which further comprises reacting the released carbon dioxide to form useful products, wherein carbon dioxide is used to produce methanol by (a) electrochemical reduction of carbon dioxide in water or (b) reducing carbon dioxide under conditions sufficient to produce methyl formate as an intermediate compound and catalytically hydrogenating the intermediate compound with hydrogen under conditions sufficient to form methanol, or by reducing the carbon dioxide under conditions sufficient to carbon monoxide, reacting the carbon monoxide with methanol under conditions sufficient to obtain methyl formate, and catalytically hydrogenating the methyl formate under conditions sufficient to produce methanol.

15. The method according to claim 14, which further comprises dehydrating the methanol under conditions sufficient to produce dimethyl ether and optionally:

heating the dimethyl ether in the presence of an acidic-basic or zeolitic catalyst under conditions sufficient to form ethylene and/or propylene;

converting the ethylene and/or propylene under conditions sufficient to higher olefins, a synthetic hydrocarbons, aromatics, or a product produced therefrom, for use as a feedstock for chemicals or as transportation fuel; or hydrating the ethylene or propylene under conditions sufficient to form ethanol or propanol.

* * * * *

UNITED STATES PATENT AND TRADEMARK OFFICE
CERTIFICATE OF CORRECTION

PATENT NO. : 9,968,880 B2  
APPLICATION NO. : 15/506077  
DATED : May 15, 2018  
INVENTOR(S) : Goeppert et al.

Page 1 of 1

It is certified that error appears in the above-identified patent and that said Letters Patent is hereby corrected as shown below:

On the Title Page

Item (54), after "REGENERATIVE", delete "ABSORBENTS" and insert -- ADSORBENTS --.

In the Claims

Column 13:
Line 21, after "enetetramine," delete "di ethylenetriamine," and insert -- diethylenetriamine --.

Signed and Sealed this  
Twenty-sixth Day of June, 2018

Andrei Iancu  
*Director of the United States Patent and Trademark Office*

UNITED STATES PATENT AND TRADEMARK OFFICE
CERTIFICATE OF CORRECTION

PATENT NO. : 9,968,880 B2
APPLICATION NO. : 15/506077
DATED : May 15, 2018
INVENTOR(S) : Alain Goeppert et al.

It is certified that error appears in the above-identified patent and that said Letters Patent is hereby corrected as shown below:

In the Specification

At Column 1, Line 9, please add the following government support clause:
"This invention was made with government support under DE-FE0000435 awarded by the Department of Energy and under DE-AR0000136 awarded by the Department of Energy (Advanced Research Projects Agency-Energy). The government has certain rights in the invention."

Signed and Sealed this
Seventeenth Day of March, 2020

Andrei Iancu
*Director of the United States Patent and Trademark Office*